(No Model.) 2 Sheets—Sheet 1.
E. D. CARTER.
COMBINED COTTON AND CORN PLANTER.
No. 445,635. Patented Feb. 3, 1891.
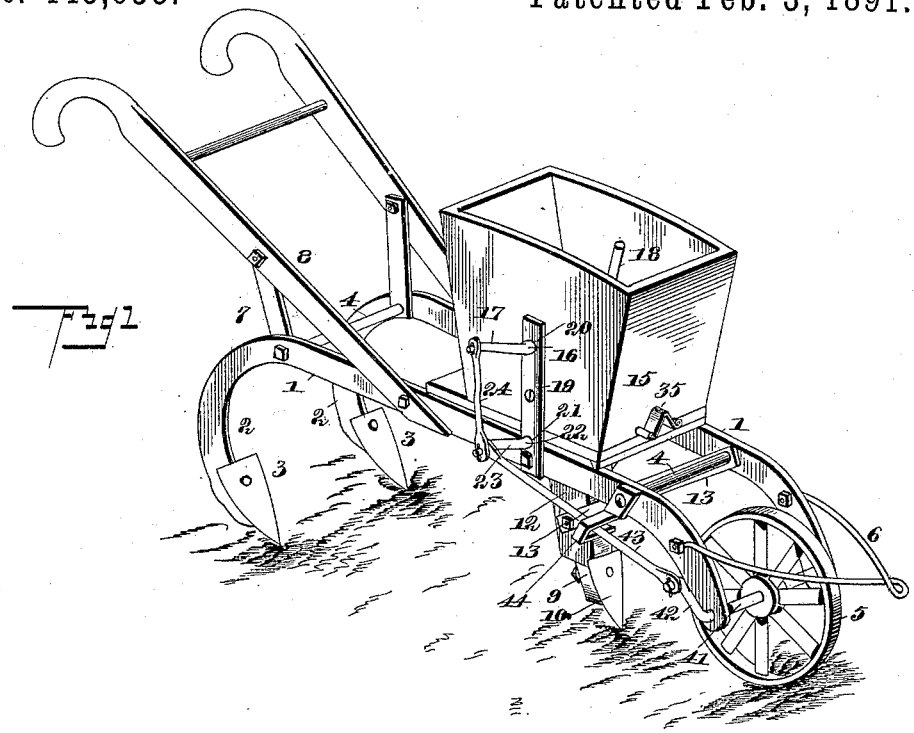
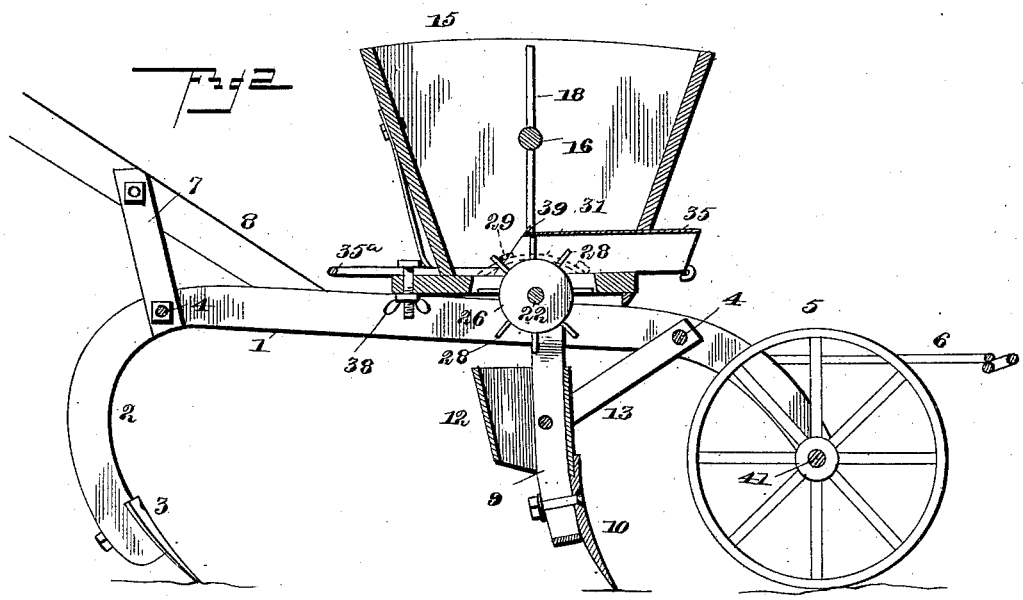
Witnesses:
John Smire
W. S. Duvall
Inventor
Edward D. Carter
By his Attorneys
C. A. Snow & Co.

(No Model.)   2 Sheets—Sheet 2.
E. D. CARTER.
COMBINED COTTON AND CORN PLANTER.
No. 445,635.   Patented Feb. 3, 1891.
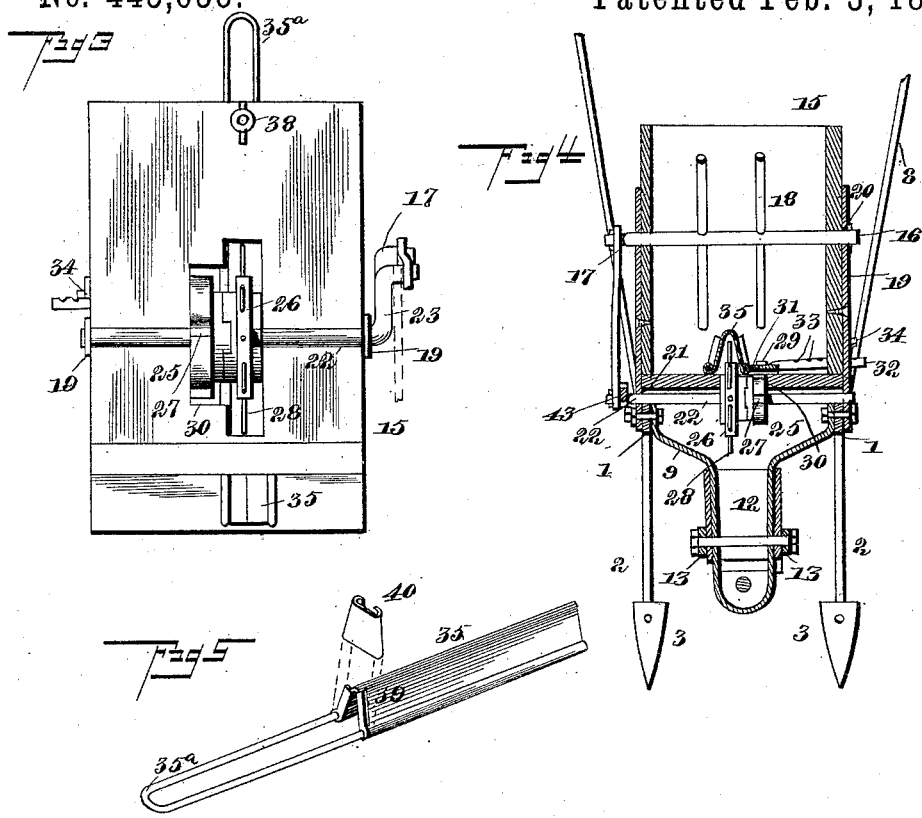
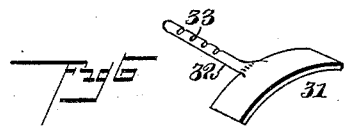
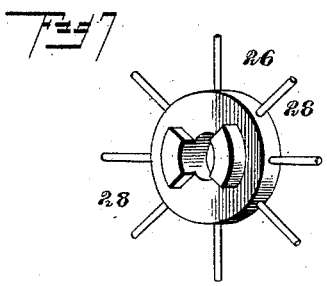
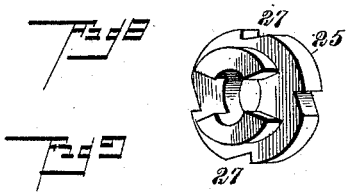
Witnesses
John Imrie
W. S. Duvall
Inventor
Edward D. Carter
By his Attorneys
C. A. Snow & Co.

UNITED STATES PATENT OFFICE.

EDWARD D. CARTER, OF CELESTE, TEXAS.

COMBINED COTTON AND CORN PLANTER.

SPECIFICATION forming part of Letters Patent No. 445,635, dated February 3, 1891.

Application filed February 18, 1890. Serial No. 340,891. (No model.)

*To all whom it may concern:*

Be it known that I, EDWARD D. CARTER, a citizen of the United States, residing at Celeste, in the county of Hunt and State of Texas, have invented a new and useful Combined Cotton and Corn Planter, of which the following is a specification.

This invention has relation to a combined cotton and corn planter, the objects in view being to provide a planter adapted to be easily and quickly thrown or converted from a machine for planting corn to one for planting cotton-seed, and vice versa, and for regulating the planting of either.

With the above main and other minor objects in view, the invention consists in certain features of construction hereinafter specified, and particularly pointed out in the claims.

Referring to the drawings, Figure 1 is a perspective of a combined cotton and corn planter constructed in accordance with my invention. Fig. 2 is a longitudinal central view of the same. Fig. 3 is a detail in bottom plan of the hopper. Fig. 4 is a transverse vertical section. Fig. 5 is a detail in perspective of the cotton-wheel guard and graduator. Fig. 6 is a detail in perspective of the corn-wheel guard and graduator. Figs. 7 and 8 are details in perspective of the cotton and corn feed wheels. Fig. 9 is a detail of the gravity-latch and a portion of the hopper.

Like numerals of reference indicate like parts in all the figures of the drawings.

The frame-work comprises the two opposite-curved side beams 1, the rear ends of which terminate in goose-neck plow-standards 2, carrying the usual shovels 3, these beams being braced apart by the usual tie-rods 4, and are connected at their front ends by the wheel 5 and provided with the draft-bail 6. Straps 7 extend from the rear portion of the beams and may be provided with perforations, whereby they are adjustably connected to the handle-sections 8, which are of the ordinary construction and connected at their front ends to the beams 1. The bifurcated plow-standard 9 has its opposite branches at their upper ends secured to the opposite beams 1, and to the lower end of said standards there may be adjustably connected a shovel 10. A seed spout or chute 12 encircles the standard above the shovel and is braced in its position by means of opposite inclined braces 13, connected at their upper ends to the side beams, as shown.

15 represents the hopper, which is mounted upon the beams directly over the bifurcated or central standard, and mounted in the side walls of the same is an agitator-shaft 16, one end of which is cranked, as at 17, outside of the wall of the hopper, and between its walls said shaft is provided with a series of agitating-arms 18. Metal straps 19 serve as a support or securing device for the hopper, such a strap being applied to each side of the same and securely bolted at their lower ends to the side beams. The upper ends of the strap are also provided with openings 20, which serve as bearings for the agitator-shaft.

Openings 21 are formed in the strap just below the bottom of the hopper, and in the same is journaled a transverse shaft 22, having a crank-arm 23 at one end, said arm being of less length than the crank-arm of the agitator-shaft, and connected to the same by a connecting-link 24.

Removably mounted upon the shaft 22, which is the feed-shaft, is a pair of wheels 25 26, the former being the corn-feeding wheel and having its periphery provided with a series of notches 27, and the latter being the cotton-feeding wheel 26, and having its periphery provided with a series of radiating arms 28. The adjacent faces of the wheels are provided with interlocking and alternating recesses and lugs, so that when the shaft operates the wheels rotate in unison. The cotton-wheel is fastened to the shaft, but the corn-planting wheel, the capacity of which must be varied, is made removable from the shaft and may usually be slipped upon the shaft and into a locked position with the cotton-feeding wheel. The peripheries of both wheels project through openings formed in the bottom of the hopper, and slightly above the same. A pair of guides 29 are mounted at the ends of the opening 30, through which projects the corn-feeding wheel, and mounted for lateral movement in the guides is a curved hood 31, adapted to be either projected entirely over the periphery of the wheel or but partially. An arm 32 projects from the side of the guard to the adjacent wall of the hopper and is provided with a series of notches 33 beyond said wall, into which there is adapted to be projected a latch 34, so that the guard may be locked in any of its adjusted positions, and in this manner each notch of the wheel adapted to receive one or a greater number of kernels.

An inverted-V-shaped hood 35 is mounted upon a bifurcated handle 35ᵃ, passed longitudinally through the hopper and lying upon the bottom of the same, a bifurcation of the handle lying at each side of the wheel for feeding the cotton seed. By operating the handle it is apparent that more or less of the periphery of the wheel will be exposed, and thus a greater or less quantity of cotton-seed carried by the radiating arms and delivered into the feed-spout secured to the central bifurcated plow-standard. A binding-screw 38 passes through the bifurcations of the handle and through the bottom of the hopper, and may be manipulated so as to bind the handle in any of the adjusted positions. The inner edges of the inverted-V-shaped guards are flanged, as at 39, and adapted to fit over the same is a sliding cap 40. This cap is merely used when the cotton-feeding device is not to be employed, and serves merely to complete the covering of the cotton-feeding wheel.

The axle 41, upon which is mounted the wheel 5, has one of its ends cranked, as at 42, and is connected to the crank of the feed-shaft by a pitman 43, which is supported intermediate its connections by a guide 44, depending from one of the side bars or beams 1.

The operation of the invention is as follows: The cotton-seed or corn to be planted, as the case may be, is placed in the hopper and either of the guards of the wheels covered and the other one graduated or adjusted over the proper wheel. The machine being started, the wheel through the pitman rotates the feed-shaft, which in turn through the connecting-link imparts motion to the agitator-shaft. By reason of the difference in length between the cranks of the feed and agitator shafts, what will rotate the feed-shaft will serve to but partially rotate the agitator-shaft, and thus the latter shaft is merely oscillated back and forth within the hopper.

Having thus described my invention and its operation, what I claim is—

1. In a planter of the class described, the combination, with a hopper, of a feed-shaft and means for operating the same, and a wheel provided with a series of radiating spokes, a bifurcated handle embracing the wheel, a set-screw for adjusting the same, and an inverted-V-shaped hood mounted over the wheel, substantially as specified.

2. In a planter of the class described, the combination, with the side beams and the hopper, of a feed-shaft and means for rotating the same, a corn-feeding wheel mounted on the shaft and provided with grain-receiving recesses, an imperforate guard mounted in guides adapted for lateral movement over the wheel and provided with a handle or bar projecting beyond the wall of the hopper and provided with a series of notches, and a latch adapted to be swung down into one of said notches and thereby adjust the guard over the wheel, substantially as specified.

3. In a planter of the class described, the combination, with the hopper and the feed-shaft having the cotton and corn planting wheels, of the handle passing longitudinally through the hopper, the set-screw for adjusting the same, the inverted-V-shaped guard flanged at its inner end and mounted on the handle, and the removable sliding cap fitting the flanges, and the laterally-movable guard mounted over the corn-feeding wheel and having the notched handle-bar projecting through the hopper, and the latch secured to the wall of the hopper and adapted to take into the notches, substantially as specified.

4. In a planter of the class described, the combination, with the feed-shaft, of the feed-wheel mounted fixedly upon the shaft, and a second feed-wheel movably mounted on the shaft and interlocking with the fixed feed-wheel, substantially as specified.

5. In a machine of the class described, the combination, with the feed-shaft provided with a fixed feed-wheel, of a removable feed-wheel, the adjacent faces of the wheels being provided with alternating recesses and lugs and adapted to interlock with each other, substantially as specified.

6. In a planter of the class described, the combination, with the side beams and the hopper, of a feed-shaft and means for rotating the same, a corn-feeding wheel having grain-receiving recesses mounted on the shaft, an imperforate guard mounted in guides adapted for lateral movement over the wheel, and means for locking the guard over the wheel, substantially as specified.

7. In a planter of the class described, the combination, with the hopper and the feed-shaft having the cotton and corn planting wheels, of the handle passing longitudinally through the hopper, the set-screw for adjusting the same, the inverted-V-shaped guard, flanged at its inner end and mounted on the handle, and the removable sliding cap fitting the flanges, substantially as specified.

In testimony that I claim the foregoing as my own I have hereto affixed my signature in presence of two witnesses.

EDWARD D. CARTER.

Witnesses:
D. C. KENNEDY,
J. M. HOARD.